United States Patent
Zaiken et al.

(10) Patent No.: US 6,741,984 B2
(45) Date of Patent: May 25, 2004

(54) METHOD, SYSTEM AND STORAGE MEDIUM FOR ARRANGING A DATABASE

(75) Inventors: Lisa Zaiken, Pittsfield, MA (US); Maia Navarrete, Saratoga Springs, NY (US); Peter Kurto, Pittsfield, MA (US)

(73) Assignee: General Electric Company, Pittsfield, MA (US)

( * ) Notice: Subject to any disclaimer, the term of this patent is extended or adjusted under 35 U.S.C. 154(b) by 209 days.

(21) Appl. No.: 09/792,460

(22) Filed: Feb. 23, 2001

(65) Prior Publication Data

US 2002/0152192 A1 Oct. 17, 2002

(51) Int. Cl.[7] .............................................. G06F 17/30
(52) U.S. Cl. ................................................. 707/5; 707/3
(58) Field of Search ........................ 707/1–6, 10, 100, 707/102; 715/513

(56) References Cited

U.S. PATENT DOCUMENTS

| | | | |
|---|---|---|---|
| 5,933,822 A | 8/1999 | Braden-Harder et al. | 707/5 |
| 5,983,216 A | 11/1999 | Kirsch et al. | 707/2 |
| 6,012,053 A | 1/2000 | Pant et al. | 707/3 |
| 6,067,552 A | 5/2000 | Yu | 707/501 |
| RE36,727 E | 6/2000 | Kageneck et al. | 707/3 |
| 2002/0073079 A1 * | 6/2002 | Terheggen | 707/3 |
| 2002/0099700 A1 * | 7/2002 | Li | 707/5 |
| 2002/0174101 A1 * | 11/2002 | Fernley et al. | 707/1 |

* cited by examiner

*Primary Examiner*—Alford Kindred (57) ABSTRACT

An exemplary embodiment is a method, system and storage medium for arranging a database corresponding to a first Web site accessed by a user. The system includes a host system for preparing a plurality of groups of keywords, each of the plurality of groups having a corresponding relevancy weight, wherein each of the plurality of groups includes keywords based on a specificity ranking, receiving a question including a term, determining whether the term in the question corresponds to one of the plurality of groups, assigning the corresponding relevancy weight to the term, determining a link to a second Web site based on the assigning and presenting the link. A network is coupled to the host system, and a database is coupled to the host system.

38 Claims, 5 Drawing Sheets

| NO. | URL | Dropdown 1 Default | Root Question | Trailing Phrase | Dropdown 2 Default | Keyword(s) | Syn 1 | Ranks |
|---|---|---|---|---|---|---|---|---|
| 1 | http://www.geplastics.com/resins/.../product/.../cycolac prod.pdf | VALOX © | Product Guide | for the Americas and the Pacific | N/A | VALOX, product guide | properties | valox 2, product guide 2, properties 1 |
| 2 | http://www.geplastics.com/resins/product/valox.html | VALOX © | Product | overview | N/A | VALOX, product | PBT | valox 3, PBT 3, product 2 |
| 3 | http://www.geplastics.com/resins/..photo/automotive...html | "photo" | Picture of an auto bumper | using | VALOX © | VALOX, picture, bumper | photo | valox 3, bumper 3, picture 3, photo 3 |

METHOD, SYSTEM AND STORAGE MEDIUM FOR ARRANGING A DATABASE

BACKGROUND

The invention relates generally to searching information in a database and, more specifically, to a method, system and storage medium for arranging a database.

In the past, searching techniques were optimized to find all information that was even slightly relevant to a search term. In other words, the searcher was inundated with results that buried relevant results in multiple pages of results, or that did not even include relevant results. Although some techniques allowed for "exact phrase" matching to retrieve a relevant result, the user had to know what "exact phrase" to use.

Further, traditional searching techniques are unforgiving in that they do not account for misspelled words, typos, company specific language and nomenclatures. Basically, these techniques merely counted words and phrases without any connection to the actual meaning of the words and phrases, resulting in a flood of irrelevant search results. Additionally, poorly managed or developed databases may cause incorrect or unusable search results. Finally, traditional searching techniques leave users discouraged and irritated after surfing through endless, irrelevant search results.

Thus, there is a need for an efficient and effective method, system and storage medium for arranging a database.

SUMMARY

An exemplary embodiment is a method, system and storage medium for arranging a database corresponding to a first Web site accessed by a user. The system includes a host system for preparing a plurality of groups of keywords, each of the plurality of groups having a corresponding relevancy weight, wherein each of the plurality of groups includes keywords based on a specificity ranking, receiving a question including a term, determining whether the term in the question corresponds to one of the plurality of groups, assigning the corresponding relevancy weight to the term, determining a link to a second Web site based on the assigning and presenting the link. A network is coupled to the host system, and a database is coupled to the host system.

BRIEF DESCRIPTION OF THE DRAWINGS

Referring now to the drawings wherein like elements are numbered alike in several FIGURES.

DETAILED DESCRIPTION

Figure 1:
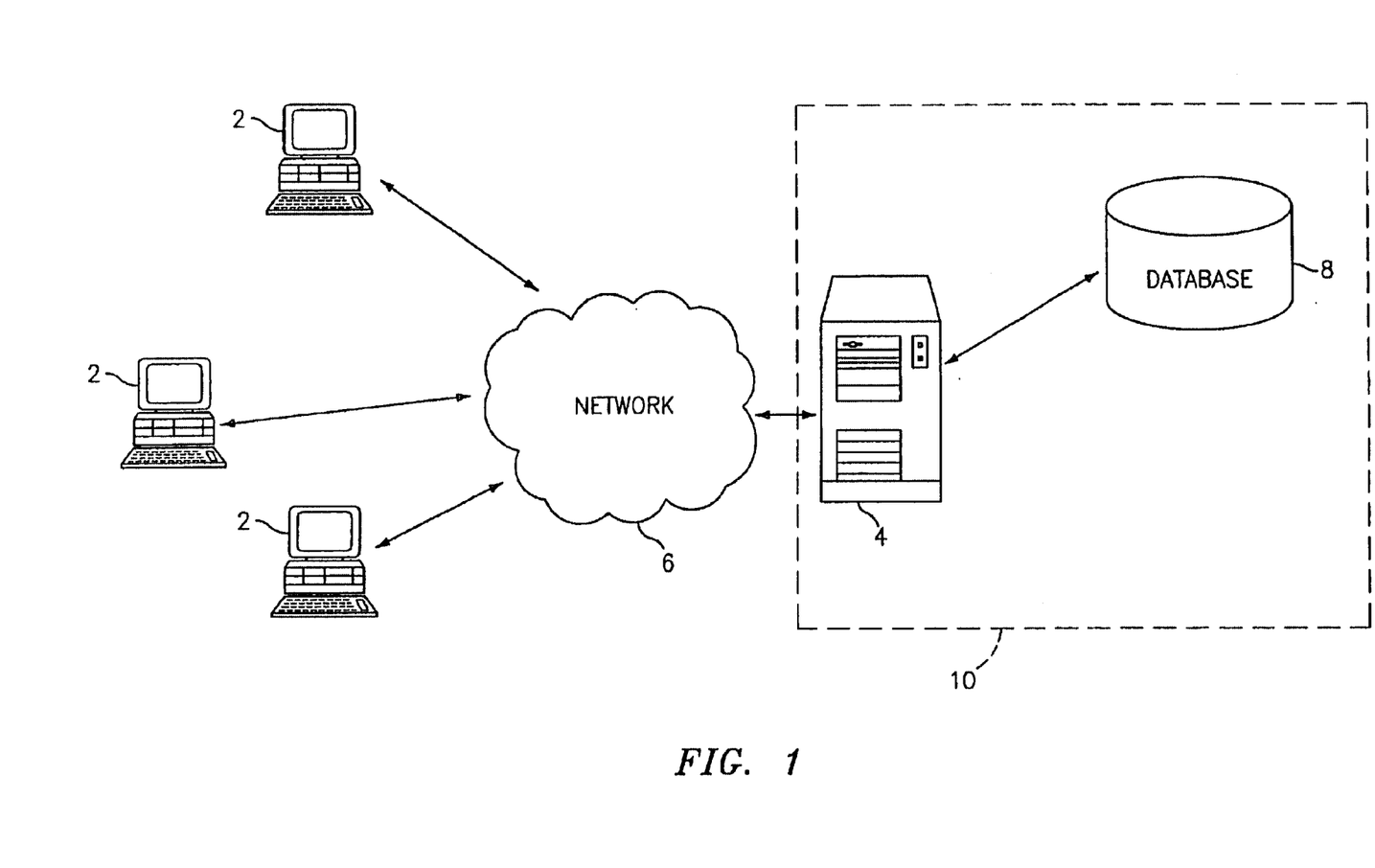
FIG. 1 is a block diagram of an exemplary system for arranging a database in an embodiment.

FIG. 1 is a block diagram of a system for arranging a database in one embodiment of the invention. The system includes one or more user systems 2 coupled to a host system 10 via a network 6. Each user system 2 may be implemented using a general-purpose computer executing a computer program for carrying out the processes described herein. The network 6 may be any type of known network including a local area network (LAN), wide area network (WAN), global network (e.g., Internet), intranet, extranet, etc. The user systems 2 may be coupled to the host system 10 through multiple networks (e.g., intranet and Internet) so that not all user systems 2 are coupled to the host system 10 via the same network. One or both of the user systems 2 and the host system 10 may be connected to the network 6 in a wireless fashion and network 6 may be a wireless network. In a preferred embodiment, the network 6 is the Internet and user system 2 executes a user interface application (e.g., Web browser) to contact the host system 10 through the network 6. Alternatively, a user system 2 may be implemented using a device programmed primarily for accessing network 6 such as WebTV or a network computer.

The host system 10 includes a processor, such as a server 4 operating in response to a computer program stored in a storage medium accessible by the server. The server 4 may operate as a network server (often referred to as a Web server) to communicate with the user systems 2. The server 4 handles sending and receiving information to and from user systems 2 and can perform associated tasks. The server 4 may also include a firewall to prevent unauthorized access to the host system 10 and enforce any limitations on authorized access. The firewall may be implemented using conventional hardware and/or software as is known in the art.

The server 4 may also operate as an applications server. In other words, the server 4 may execute one or more computer programs to interact with a database 8. It is understood that separate servers may be used to implement the network server functions and the applications server functions. Alternatively, the network server, firewall and the applications server may be implemented by a single server executing computer programs to perform the requisite functions.

Database 8 contains a variety of information related to arranging a database. The database 8 may be contained in a legacy, mainframe system also maintained by the affiliate network. Server 4 may interact with database 8 through existing legacy components. Changes to database 8 can be made dynamically, in real time to instantaneously update information contained in the database 8.

Figure 2:
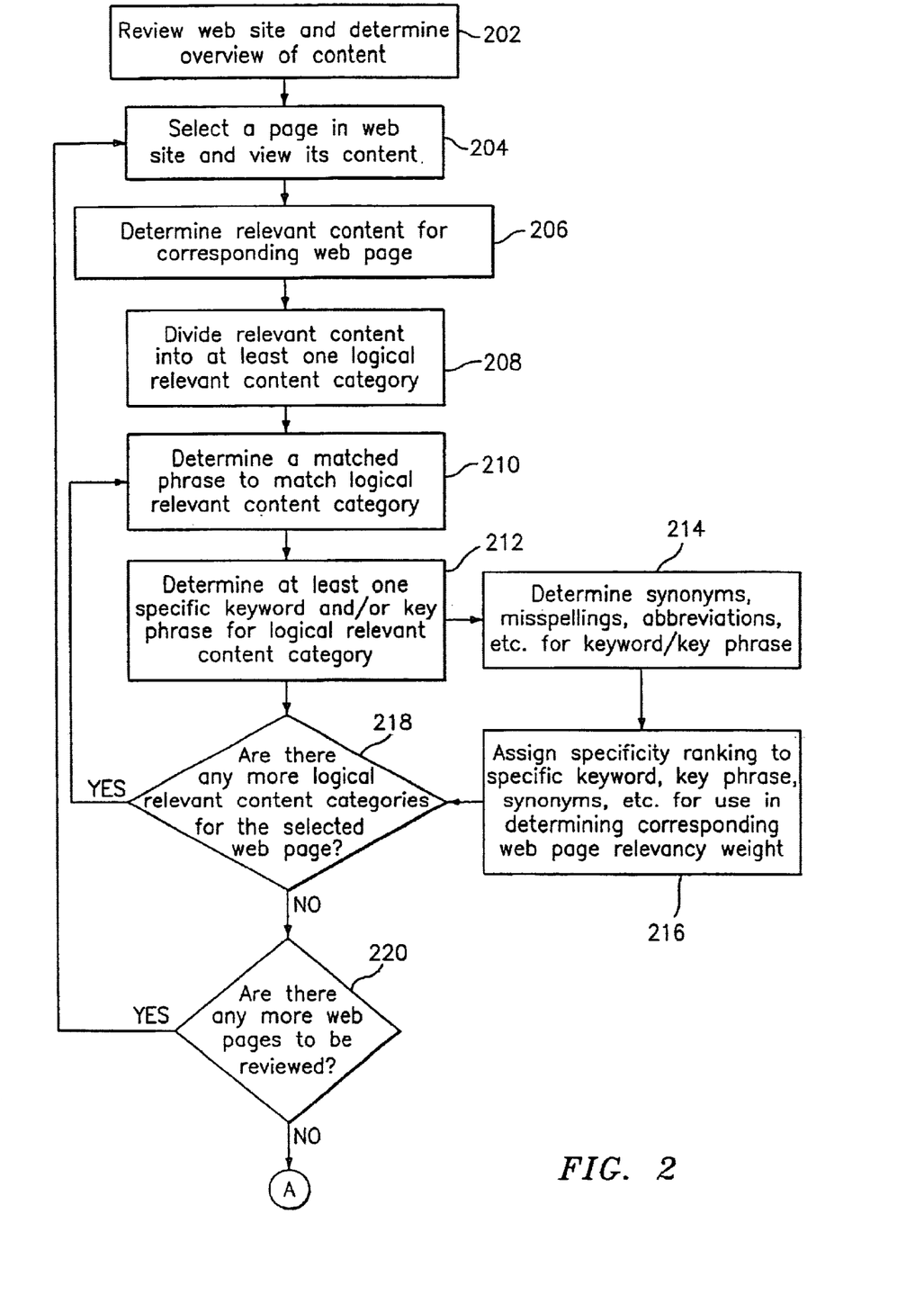
FIGS. 2–3 illustrate an exemplary method for arranging a database in an embodiment.
Figure 3:
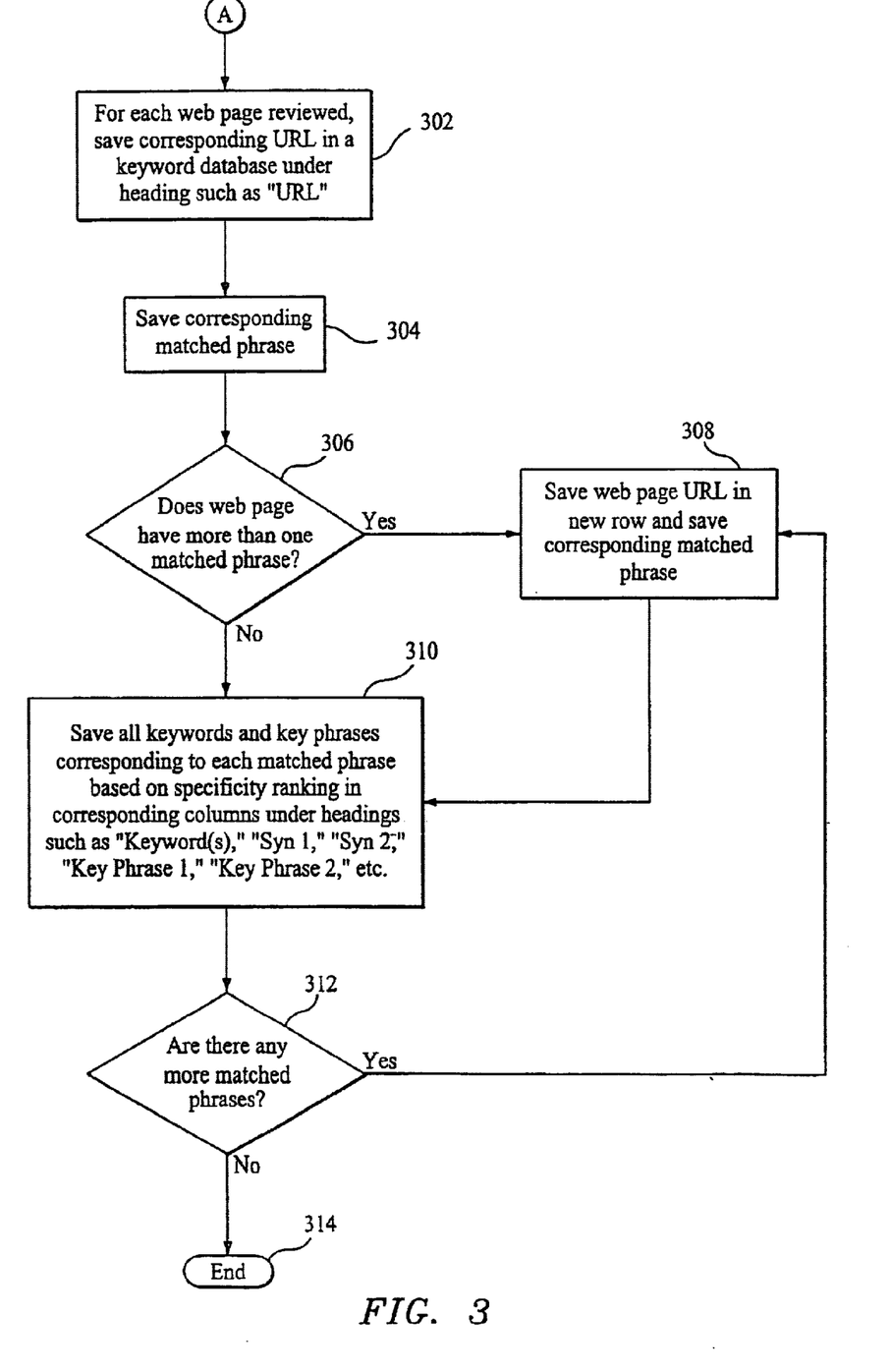

One advantage to the user of the embodiments described herein is that search results are more relevant and specific. Therefore, a more quick and accurate search may be achieved. Referring to FIG. 2 and FIG. 3, operation of the system will now be described. First, referring to FIG. 2, in step 202, the entire Web site is reviewed to get an overview of its content. For example, the Web site may be for GE Plastics, and an overview may determine that many Web pages contain information regarding numerous resin products offered by GE Plastics. In step 204, one of the Web pages is selected and its content is viewed. In a first example, a Web page may list GE Plastics' site locations and show a picture of the main office surrounded by trees. In a second example, a Web page may be for products using a particular resin, and information regarding the resin. Next, in step 206, the relevant content for the corresponding Web page is determined. Thus, in the first example, the Web page's relevant content may be site locations, the main office and picture of main office, but trees may not be relevant (even if the word tree is on the Web page). In the second example, a Web page containing information for a resin, such as VALOX©, may have relevant content in the form a general description of the resin. In step 208, the relevant content is divided into at least one logical relevant content category. In the VALOX© example, one logical relevant content category may be "overview of VALOX©." Next, in step 210, a matched phrase for the logical relevant content category is determined. In other words, a clear and simple phrase that describes the relevant content of the Web page to someone surfing the Web site is determined. In the first example, phrases that may be determined are: "View a picture of our main office building" and "Display a list of all of our company site locations." In the second example, the matched phrase may be "VALOX© product overview." The matched phrase may be used as a hypertext link to the corresponding Web page URL.

In step 212, at least one specific keyword or key phrase, corresponding to the logical relevant content category, is determined. Note that the keyword or key phrase may not actually be on the Web page, but will match the logical relevant content category for the Web page (thus, also matching the matched phrase). In the first example, a picture of a building may be included on the Web page, without the word "picture" used anywhere on that page. Specific keywords and key phrases related to that section of the Web page may include: building, main, site, picture, photo, main building, HQ, headquarters. Note that the word "tree" was not selected as a specific keyword because even though a tree was on the page, the tree was not determined to be a logical relevant content category. Thus, a user typing in the request "Show me trees" would not get a hit on the Web page. Note that in a traditional search, the entire Web page content would be searched (instead of specific or "mapper defined" content), thus, the user would produce an erroneous and unwanted match for "Show me trees." However, the methods of the embodiments described herein would not produce a match on the Web page of the first example. Instead, more pinpointed and relevant search results are obtained using the embodiments described herein.

Returning to FIG. 2, in step 214, a synonym, misspelling, abbreviation, etc. for the keyword/key phrase may be determined. For example, for the keyword "car," synonyms may be automobile and auto. Thus, a user searching on "auto's" or "automobiles" will get the same search results as for the keyword "car." Likewise, misspellings, such as "automobeel" may be included. Next, in step 216, each specific keyword, key phrase, synonym, etc. is ranked for use in determining the corresponding Web page's relevancy weight. In other words, some Web pages may be more pertinent to a user question or search (even if they contain the same keywords as other Web pages). Therefore, to increase relevancy of a particular Web page, the keyword, etc. is ranked.

phrase (corresponding to a particular Web page URL) before another. For example, if GE Plastics wanted its marketing page to come up before its home page on a search result, the keywords for the marketing page may be marketing, promotion, GE Plastics, GE Plastics, GE Plastics. The keywords for the home page may be home page, about, home, GE Plastics. In this example, if a user typed in the search "Where can I find information on GE Plastics," the resulting matched phrases (that would link the user to the corresponding Web page URL) may be displayed with the marketing page first and the home page second. Note that the relevancy ranking may be changed periodically by adding to or subtracting from the multiplied keywords.

As a further example of ranking and relevancy, two different Web pages may contain the following keywords:

Web page A)—Gary, Rogers, photo

Web page B)—Gary, photo, photo, photo, photo.

If the user asks the question "Where can I see a photo of Gary Rogers," Web page A) is most relevant because three keywords are present—"Gary," "Rogers" and "photo," while only two keywords are present in Web page B)—"Gary" and "photo." However, if the user asks the question "Where can I see photos," Web page B) is most relevant because "photo" appears four times in the keywords for Web page B), while it appears only once in the keywords for Web page A).

The relevancy weighting of matched phrases may be based upon two criteria: the anticipated type of user question and the type of Web pages that exist on the Web site. Matched phrases that represent general content may be weighted more with "general" terminology to answer general questions, while specific content pages may not be weighted at all. For example, a Web page that provides general information about LEXAN© polycarbonate may have a URL www.geplastics.com/resins/datasheets/lexan.htm. LEXAN© has many different grades of material, and each grade has its own datasheet, along with a corresponding Web page. Note that LEXAN© may have thousands of grades, each with a corresponding Web page (e.g., www.geplastics.com/resins/datasheets/lexan/101.htm, www.geplastics.com/resins/datasheets/lexan/102.htm, etc.). "General" keywords are ranked to direct users to the most relevant "general" matched phrases, but also directing users to specific content if asked. The following table is an example of an embodiment of weighting matched phrases:

| URL | Matched Phrase | Keywords |
| --- | --- | --- |
| www.geplastics.com/resins/datasheets/lexan.htm | LEXAN Datasheets | LEXAN, LEXAN, LEXAN, datasheet |
| www.geplastics.com/resins/datasheets/lexan/101.htm | LEXAN 101 Datasheet | LEXAN, 101, datasheet |
| www.geplastics.com/resins/datasheets/lexan/101.htm | LEXAN 102 Datasheet | LEXAN, 102, datasheet |

Figure 5:
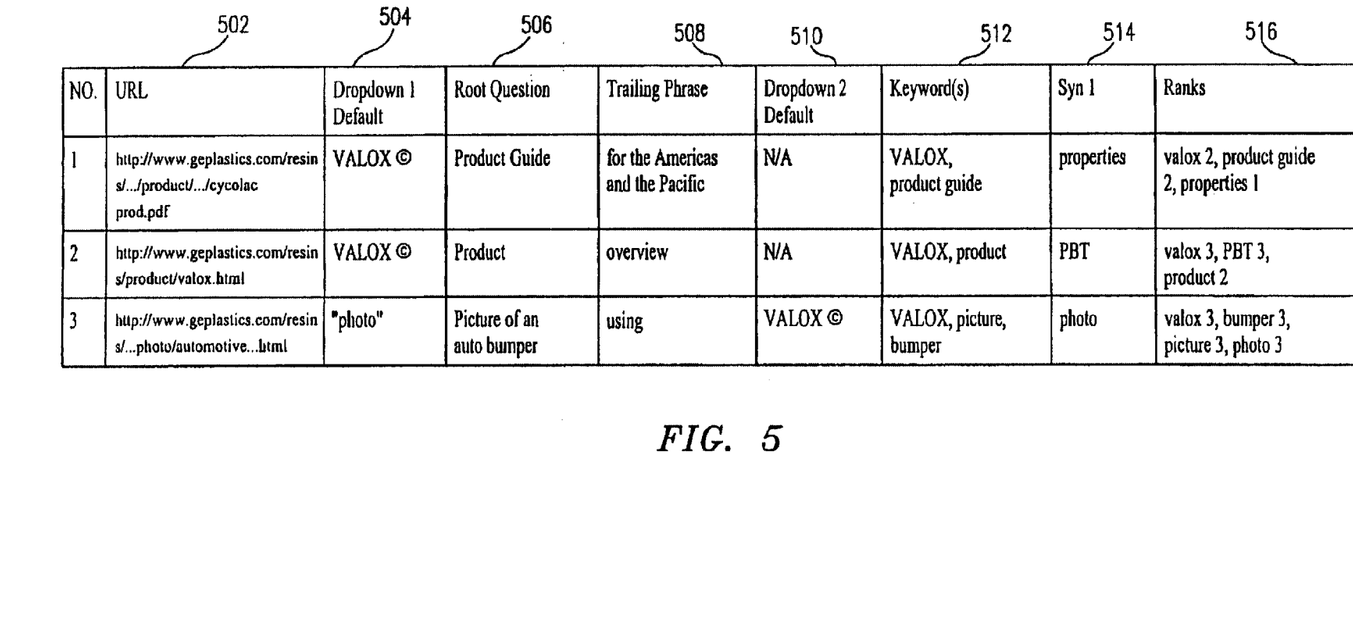
FIG. 5 illustrates an exemplary spreadsheet for arranging a database in an embodiment.

In the embodiment shown in FIG. 5, keywords, etc. are assigned a numeric specificity ranking as shown in the Ranks column 516. In that embodiment, words with a rank of two are added to a "ranks" database twice, words with a rank of three are added to the ranks database three times, and so on. However, ranking may be accomplished any number of ways, as long as the ranking creates a higher relevancy for an identical word or phrase match and displays one matched Examples of possible user questions and the corresponding answers (Matched phrases) are as follows:

Q: What is LEXAN? (this may be treated as a general question)

A: LEXAN Datasheets (this is most relevant because the "general" word "LEXAN" has a rank of three)

LEXAN 101 Datasheet (this is less relevant because "LEXAN" has a rank of one)

LEXAN 102 Datasheet (this is less relevant because "LEXAN" has a rank of one)

Q: What is LEXAN 101? (this may be treated as a specific question)

A: LEXAN 101 Datasheet (this is most relevant because both "LEXAN" and "101" are keywords)

LEXAN Datasheets (this is the second most relevant because "LEXAN" has a rank of three)

LEXAN 102 Datasheet (this is least relevant because "LEXAN" has a rank of one)

Returning to FIG. 2, next, in step 218, whether there are any more logical relevant content categories for the Web page is determined. If so, step 210 is repeated. Otherwise, step 220 determines whether there are any more Web pages to be reviewed. If so, step 204 is repeated. Otherwise, the process flows to FIG. 3. In step 302, for each Web page reviewed, the corresponding URL is saved. In the embodiment of FIG. 5, a spreadsheet is used to save the URL in the URL column 502. In step 304, the corresponding matched phrase is saved. Referring again to FIG. 5, an embodiment for the matched phrase is saved in four different columns: a Dropdown Default 1 column 504, a Root column 506, a Trailing Phrase column 508 and a Dropdown Default 2 column 510. Note that in the embodiment of FIG. 5, the matched phrase columns include two dropdown default columns 504 and 510. These dropdown default columns are discussed below.

Next, step 306 determines whether the Web page contains more than one matched phrase. If there is another matched phrase, in step 308, the corresponding URL and matched phrase are saved (the URL and matched phrase are saved in a new row in embodiments utilizing a spreadsheet such as shown in FIG. 5). Next, in step 310, all keywords and key phrases corresponding to the matched phrase are saved with their corresponding specificity ranks. In the example of FIG. 5, included for saving the data are a Keyword(s) column 512, a synonym (Syn 1) column 514 and a Ranks column 516. If, in step 306, there is not another matched phrase, flow continues to step 310. Next, step 312 determines whether there are any more matched phrases. If there are more matched phrases, step 308 is repeated. Otherwise, the process ends at step 314.

Figure 4:
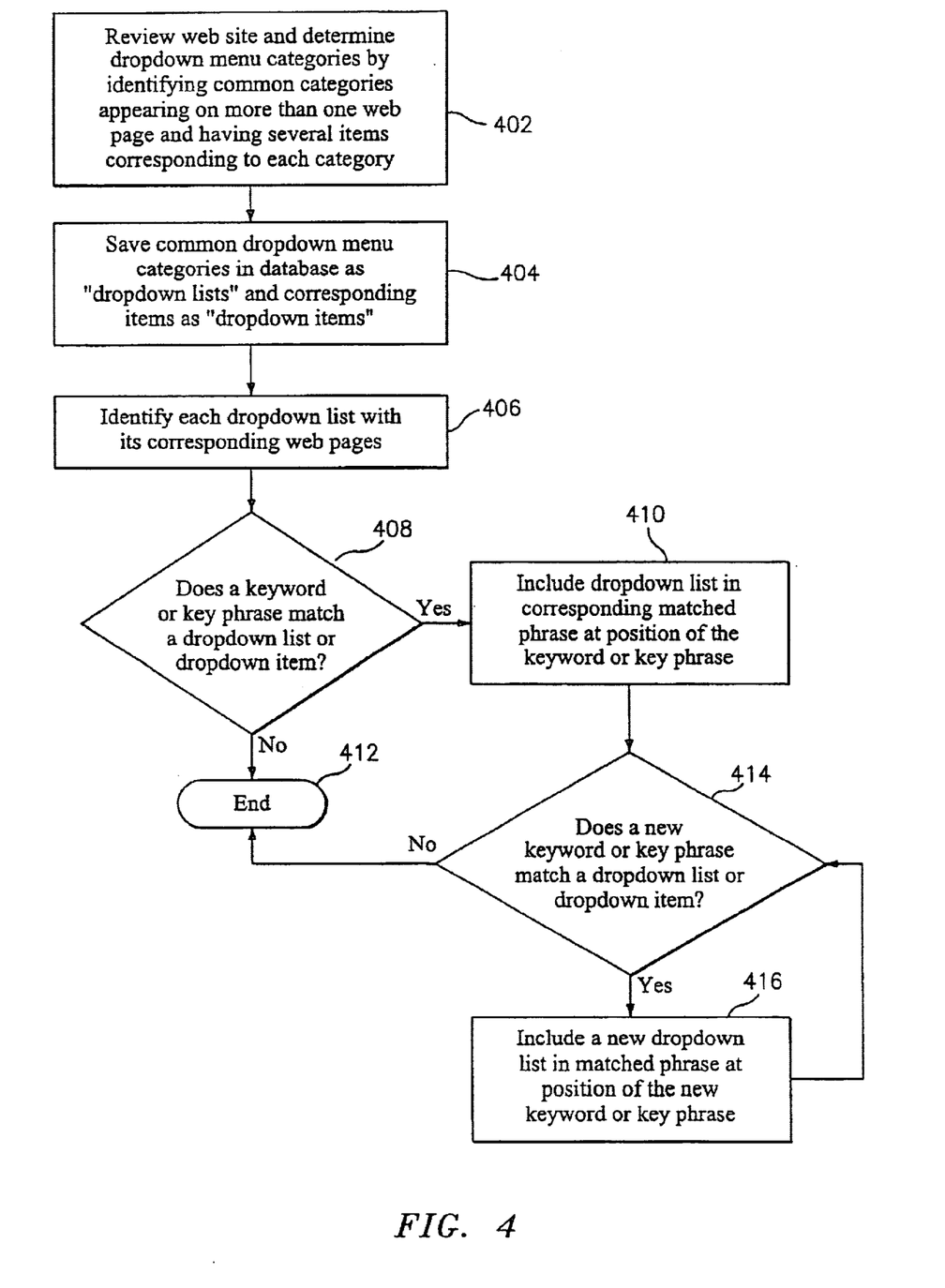
FIG. 4 illustrates an exemplary method for dropdown menus in an embodiment.

FIG. 4 illustrates an exemplary method for creating dropdown menus. A dropdown menu is a menu that includes more than one item in a selectable list. For example, in row No. 1 of FIG. 5, the Dropdown 1 Default 504 is VALOX©. In other words, in the matched phrase "VALOX© Product Guide for the Americas and Pacific," a dropdown menu would be positioned at the term "VALOX©." Once presented with this matched phrase, the user may choose to select another item from the dropdown list (such as another resin). For example, the user may wish to see "LEXAN© Product Guide for the Americas and Pacific." However, for the example of row No. 1 in FIG. 5, the dropdown menu will default at the term "VALOX©" in the dropdown list. As described below, if a keyword is itself a general category, dropdown list or dropdown item, a dropdown list may appear as part of the matched phrase. Note that in another embodiment, each dropdown list may be kept in a separate database from the keyword database and identified accordingly. Additionally, if a Web page has a corresponding dropdown list, the corresponding matched phrase may be divided into parts including the dropdown list in a separate column with a separate identification. For example, the dropdown list may be labeled as "Electronic Equipment Dropdown 1." If saved in a spreadsheet, the "Default Dropdown Item" may be saved in a column immediately to the right of the Electronic Equipment Dropdown 1 column. For example, a camera Web page on an electronics Web site may have a matched phrase "Click here to buy . . . " with a dropdown labeled Electronic Equipment Dropdown 1, Default Dropdown Item Cameras. Therefore, the user would see the hyperlinked matched phrase "Click here to buy cameras," where "cameras" is the default item in a dropdown list. The user may then select another item within the dropdown list, such as DVDs.

Further, a multiple dropdown may occur from a user question such as "I would like to buy plastics for use in auto parts." The resulting hyperlinked matched phrase may be "Click here to buy (Manufacturer 1) GE Plasitics (Resin Dropdown 1, Default Dropdown Item) resins." Thus, the search may be streamlined so that many different manufacturers and products may be accessed within just one search. Another benefit is when a Web page, such as a GE Plastics resins page has only one keyword—GE Plastics. If this is the only place GE Plastics is used as a keyword on the entire Web site, the user gets a pinpointed result "Click here to buy (Manufacturer 1) GE Plasitics (Resin Dropdown 1, Default Dropdown Item) resins." Taking this one step further, if the user knows only a part number, the GE Plastics page related to that part number may not even have GE Plastics as a keyword, but only the part number. Thus, the user may receive a matched phrase with three dropdown lists—"Click here to buy (Manufacturer 1) GE Plastics (Part Number GE Plastics 1) 12345 (Resin Dropdown 1, Default Dropdown Item) resins." In such a case, the matched phrase is determined by recognizing that the only time this triple dropdown may be displayed is when the user knows the part number. Thus, the only keyword for this case would be 12345, and the user is insured that only the most relevant matches are displayed.

Returning to the method of FIG. 4, in step 402, the Web site is reviewed to determine dropdown menu categories by identifying common categories appearing on more than one Web page and having more than one associated item. In other words, the entire Web site is reviewed to identify any common general categories that appear on multiple pages, and that have several items within each category. For example, "electronic equipment" may be a general category for a Web site selling electronics and having multiple Web pages and several items within the category, such as cameras, computers, CD players and the like. Thus, the "electronic equipment" category may have a dropdown list with dropdown items shown as cameras, computers and CD players. In step 404, common dropdown menu categories may be saved as one or more dropdown lists with their corresponding items. In step 406, each dropdown list is identified with its corresponding Web pages. Step 408 determines whether a keyword or key phrase matches a dropdown list or dropdown item. If so, then in step 410, the dropdown list is included in the corresponding matched phrase at the position of the keyword or key phrase. Otherwise, the process ends at step 412. Next, step 414 determines whether a new keyword or key phrase matches a dropdown list or dropdown item. If so, then in step 416, a new dropdown list is included in the corresponding matched phrase at the position of the new keyword or key phrase. Next, step 414 is repeated.

To summarize an example of one embodiment—When a user types in a search, the search engine searches the keyword database and displays the matched phrase related to the keyword match as a hypertext phrase, which is hyperlinked to the corresponding URL. An example of a search may be the following—A user types in "Where can I find your headquarters." The search engine searches the entire keyword database for each word in the user question . . . . Where+can+I+find+your+headquarters. The only match is for the word "headquarters." The match on headquarters displays the result of the matched phrase "View a picture of our main office building." The user may select the matched phrase, and the user's browser is taken to the corresponding Web page URL. Note that the keywords are carefully and sparingly selected to allow for a pinpointed result. Thus, the methods described herein may allow for searching data, concepts and ideas that may not be explicitly on a Web page, but merely implied in the content. In other words, ideas and concepts are mapped into related keywords rather than the traditional method of mapping only the explicit words found on a Web page.

For example, on the GE Website the word "GE" should not be used as a keyword except in URLs that are high level, or that GE would want to come up as matches (such as a home page or a marketing page). This is due to the problem that many user questions may include the word GE, and the matched phrase of interest may get overlooked if the user is deluged with multiple GE matches. An example of another embodiment includes a user asking the question on the GE Web site—"Tell me about careers at GE." The careers URL (and corresponding matched phrase) may have the following keywords: careers, pay, benefits, jobs, positions and opportunities but not the word "GE." Therefore, the matched phrase may be "GE career center."

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiments disclosed for carrying out this invention, but that the invention will include all embodiments falling within the scope of the appended claims.

What is claimed is:

1. A system for arranging a database corresponding to a first Web site accessed by a user, the system comprising:
    a host system for preparing a plurality of groups of keywords, each said plurality of groups having a corresponding relevancy weight, wherein each said plurality of groups includes keywords based on a specificity ranking, said specificity ranking being designated by creating multiple, identical keywords in at least of said plurality of groups, said host system receiving a question including a term, determining whether said term in said question corresponds to one of said plurality of groups, assigning said corresponding relevancy weight to said term, determining a link to a second Web site based on said assigning and presenting said link;
    a network coupled to said host system; and
    a database coupled to said host system.

2. The system of claim 1, further including:
    a user system coupled to said network; and
    said user system accessing said host system via said network.

3. The system of claim 1, wherein said specificity ranking is determined by the importance of said keyword within a subject matter of said database.

4. The system of claim 3, wherein said keyword is multiplied by said specificity ranking.

5. The system of claim 1, wherein said corresponding relevancy weight for each said plurality of groups is assigned a value based on said specificity ranking of said keywords within each said plurality of groups.

6. The system of claim 1, further including said host system:
    determining a plurality of links to a plurality of Web sites based on said assigning;
    ranking said plurality of links based on said assigning; and
    presenting said plurality of links based on said ranking.

7. The system of claim 1, wherein said presenting said link includes said host system presenting a hypertext phrase corresponding to said link.

8. The system of claim 7, wherein said hypertext phrase includes a dropdown menu.

9. A system for arranging a database corresponding to a first Web site accessed by a user, the system comprising:
    a host system for preparing a plurality of groups of keywords, each said plurality of groups having a corresponding relevancy weight, wherein each said plurality of groups includes keywords based on a specificity ranking, said specificity ranking being designated by creating multiple, identical in at least one of said plurality of groups, said host system receiving a question including a plurality of terms, determining whether said plurality of terms in said question correspond to a plurality of keywords in said plurality of groups, assigning said corresponding relevancy weight to each said plurality of terms, summing said corresponding relevancy weight of each said plurality of terms, determining a link to a second Web site based on said summing and presenting said link;
    a network coupled to said host system; and
    a database coupled to said host system.

10. The system of claim 9, further including:
    a user system coupled to said network; and
    said user system accessing said host system via said network.

11. The system of claim 9, wherein said specificity ranking is determined by the importance of said keyword within a subject matter of said database.

12. The system of claim 11, wherein said keyword is multiplied by said specificity ranking.

13. The system of claim 9, wherein said corresponding relevancy weight for each said plurality of groups is assigned a value based on said specificity ranking of said keywords within each said plurality of groups.

14. The system of claim 9, further including said host system:
   determining a plurality of links to a plurality of Web sites based on said summing;
   ranking said plurality of links based on said summing; and
   presenting said plurality of links based on said ranking.

15. The system of claim 9, wherein said presenting said link includes said host system presenting a hypertext phrase corresponding to said link.

16. The system of claim 15, wherein said hypertext phrase includes a dropdown menu.

17. A method for arranging a database corresponding to a first Web site accessed by a user, the method comprising:
   preparing a plurality of groups of keywords, each said plurality of groups having a corresponding relevancy weight;
   wherein each said plurality of groups includes keywords based on a specificity ranking, said specificity ranking being designated by creating multiple, identical keywords in at least one of said plurality of groups;
   receiving a question including a term;
   determining whether said term in said question corresponds to one of said plurality of groups;
   assigning said corresponding relevancy weight to said term;
   determining a link to a second Web site based on said assigning; and
   presenting said link.

18. The method of claim 17, wherein said specificity ranking is determined by the importance of said keyword within a subject matter of said database.

19. The method of claim 18, wherein said keyword is multiplied by said specificity ranking.

20. The method of claim 17, wherein said corresponding relevancy weight for each said plurality of groups is assigned a value based on said specificity ranking of said keywords within each said plurality of groups.

21. The method of claim 17, further including:
   determining a plurality of links to a plurality of Web sites based on said assigning;
   ranking said plurality of links based on said assigning; and
   presenting said plurality of links based on said ranking.

22. The method of claim 17, wherein said presenting said link includes presenting a hypertext phrase corresponding to said link.

23. The method of claim 22, wherein said hypertext phrase includes a dropdown menu.

24. A method for arranging a database corresponding to a first Web site accessed by a user, the method comprising:
   preparing a plurality of groups of keywords, each said plurality of groups having a corresponding relevancy weight;
   wherein each said plurality of groups includes keywords based on a specificity ranking, said specificity ranking being designated by creating multiple, identical keywords in at least one of said plurality of groups;
   receiving a question including a plurality of terms;
   determining whether said plurality of terms in said question correspond to a plurality of keywords in said plurality of groups;
   assigning said corresponding relevancy weight to each said plurality of terms;
   summing said corresponding relevancy weight of each said plurality of terms;
   determining a link to a second Web site based on said summing; and
   presenting said link.

25. The method of claim 24, wherein said specificity ranking is determined by the importance of said keyword within a subject matter of said database.

26. The method of claim 25, wherein said keyword is multiplied by said specificity ranking.

27. The method of claim 24, wherein said corresponding relevancy weight for each said plurality of groups is assigned a value based on said specificity ranking of said keywords within each said plurality of groups.

28. The method of claim 24, further including:
   determining a plurality of links to a plurality of Web sites based on said summing;
   ranking said plurality of links based on said summing; and
   presenting said plurality of links based on said ranking.

29. The method of claim 24, wherein said presenting said link includes presenting a hypertext phrase corresponding to said link.

30. The method of claim 29, wherein said hypertext phrase includes a dropdown menu.

31. A storage medium encoded with machine-readable computer program code for arranging a database corresponding to a first Web site accessed by a user, the storage medium including instructions for causing a processor to implement a method comprising:
   preparing a plurality of groups of keywords, each said plurality of groups having a corresponding relevancy weight;
   wherein each said plurality of groups includes keywords based on a specificity ranking, said specificity ranking being designated by creating multiple, identical keywords in at least one of said plurality of groups;
   receiving a question including a term;
   determining whether said term in said question corresponds to one of said plurality of groups;
   assigning said corresponding relevancy weight to said term;
   determining a link to a second Web site based on said assigning; and
   presenting said link.

32. A storage medium encoded with machine-readable computer program code for arranging a database corresponding to a first Web site accessed by a user, the storage medium including instructions for causing a processor to implement a method comprising:
   preparing a plurality of groups of keywords, each said plurality of groups having a corresponding relevancy weight;
   wherein each said plurality of groups includes keywords based on a specificity ranking, said specificity ranking being designated by creating multiple, identical keywords in at least one of said plurality of groups;
   receiving a question including a plurality of terms;
   determining whether said plurality of terms in said question correspond to a plurality of keywords in said plurality of groups;
   assigning said corresponding relevancy weight to each said plurality of terms;

summing said corresponding relevancy weight of each said plurality of terms;

determining a link to a second Web site based on said summing; and presenting said link.

33. A computer data signal for arranging a database corresponding to a first Web site accessed by a user, said computer data signal comprising code configured to cause a processor to implement a method comprising:

preparing a plurality of groups of keywords, each said plurality of groups having a corresponding relevancy weight;

wherein each said plurality of groups includes keywords based on a specificity ranking, said specificity ranking being designated by creating multiple, identical keywords in at least one of said plurality of groups;

receiving a question including a term;

determining whether said term in said question corresponds to one of said plurality of groups;

assigning said corresponding relevancy weight to said term;

determining a link to a second Web site based on said assigning; and presenting said link.

34. The computer data signal of claim 33, wherein said computer data signal is embodied in a carrier wave.

35. The computer data signal of claim 33, wherein said computer data signal is unmodulated.

36. A computer data signal for arranging a database corresponding to a first Web site accessed by a user, said computer data signal comprising code configured to cause a processor to implement a method comprising:

preparing a plurality of groups of keywords, each said plurality of groups having a corresponding relevancy weight;

wherein each said plurality of groups includes keywords based on a specificity ranking, said specificity ranking being designated by creating multiple, identical keywords in at least one of said plurality of groups;

receiving a question including a plurality of terms;

determining whether said plurality of terms in said question correspond to a plurality of keywords in said plurality of groups;

assigning said corresponding relevancy weight to each said plurality of terms;

summing said corresponding relevancy weight of each said plurality of terms;

determining a link to a second Web site based on said summing; and presenting said link.

37. The computer data signal of claim 36, wherein said computer data signal is embodied in a carrier wave.

38. The computer data signal of claim 36, wherein said computer data signal is unmodulated.

* * * * *